(12) United States Patent
Liu

(10) Patent No.: US 11,249,368 B2
(45) Date of Patent: Feb. 15, 2022

(54) DISPLAY PANEL AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventor: Kaijun Liu, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 524 days.

(21) Appl. No.: 16/313,165

(22) PCT Filed: Oct. 23, 2018

(86) PCT No.: PCT/CN2018/111308
§ 371 (c)(1),
(2) Date: Dec. 26, 2018

(87) PCT Pub. No.: WO2020/051985
PCT Pub. Date: Mar. 19, 2020

(65) Prior Publication Data
US 2021/0223656 A1 Jul. 22, 2021

(30) Foreign Application Priority Data
Sep. 12, 2018 (CN) .......................... 201811059239.0

(51) Int. Cl.
*G02F 1/19* (2019.01)
*G02F 1/1335* (2006.01)
*G02F 1/01* (2006.01)

(52) U.S. Cl.
CPC .............. *G02F 1/19* (2013.01); *G02F 1/0121* (2013.01); *G02F 1/133536* (2013.01);
(Continued)

(58) Field of Classification Search
None
See application file for complete search history.

(56) References Cited

U.S. PATENT DOCUMENTS

2009/0231706 A1 9/2009 Chen et al.
2016/0334664 A1* 11/2016 Zhuang ............. G02F 1/133555
2021/0097943 A1* 4/2021 Wyatt ................... G02F 1/1335

FOREIGN PATENT DOCUMENTS

CN 101063757 A 10/2007
CN 103064192 A 4/2013
(Continued)

OTHER PUBLICATIONS

Transmission Analysis of Single Layer Sub-Wavelength Metal Gratings. Wang, Zhiwen et al.. Acta Optica Sinica, vol. 35, No. 7, Jul. 2015.

*Primary Examiner* — Ashok Patel

(57) ABSTRACT

This application provides a display panel and a display device. The display panel includes a first substrate, a second substrate, and a duty cycle circuit. The first substrate includes a reflective polarizer, and there is only one reflective polarizer in the display panel.

17 Claims, 3 Drawing Sheets

(52) U.S. Cl.
CPC .. *G02F 1/133548* (2021.01); *G02F 2201/307* (2013.01); *G02F 2201/44* (2013.01)

(56) References Cited

FOREIGN PATENT DOCUMENTS

| | | |
|---|---|---|
| CN | 103837917 A | 6/2014 |
| CN | 104516044 A | 4/2015 |
| CN | 106019454 A | 10/2016 |
| CN | 107272264 A | 10/2017 |
| CN | 108181677 A | 6/2018 |

\* cited by examiner

DISPLAY PANEL AND DISPLAY DEVICE

This application claims priority to Chinese Patent Application No. CN 201811059239.0, filed with the Chinese Patent Office on Sep. 12, 2018 and entitled "DISPLAY PANEL AND DISPLAY DEVICE", which is incorporated herein by reference in its entirety.

TECHNICAL FIELD

This application relates to the field of display technologies, and more specifically to a display panel and a display device.

BACKGROUND

It should be understood that descriptions herein merely provide background information related to this application, and do not necessarily constitute the prior art. Liquid crystal displays have advantages such as thin body, power saving, no radiation, etc., and are widely applied. Most of the liquid crystal displays known by the inventor are backlit type liquid crystal displays, each including a liquid crystal panel and a backlight module. A working principle of the liquid crystal panel is placing liquid crystal molecules between two parallel glass substrates, and applying a drive voltage to the two glass substrates to control rotation directions of the liquid crystal molecules, to refract light rays of the backlight module to generate images.

A thin film transistor-liquid crystal display (TT-LCD) has two polarizers that are respectively adhered at two sides of the glass substrate. A lower polarizer converts light beams generated by a backlight source into polarized light, and an upper polarizer parses polarized light electrically modulated by liquid crystals, to generate a light-and-dark contrast, so as to generate images.

For example, to prevent PVA from losing polarization due to water absorption and color fading, TAC films (cellulose triacetate) are adhered at both sides of the polarizer for protection. An ultraviolet shielding polarizer can be manufactured by using the TAC film having an ultraviolet cut (UV CUT) function. However, it is complex to manufacture the polarizer, the polarizer is easy to deteriorate, and weatherproof performance still cannot reach an ideal status.

SUMMARY

The problem to be resolved by this application is to provide a display panel and a display device that do not easily deteriorate and that are easy to be manufactured.

To achieve the foregoing objective, this application provides a display panel. The display panel comprises:
a first substrate, comprising a reflective polarizer;
a second substrate, arranged parallel and opposite to the first substrate; and
a duty cycle circuit, arranged in the display panel, and configured to adjust a duty cycle corresponding to the reflective polarizer to block ultraviolet light, wherein the first substrate comprises a first glass substrate, the reflective polarizer is arranged on an inner side of the first glass substrate, the reflective polarizer comprises metal gratings and slits, the slits are formed between the metal gratings, the reflective polarizer comprises a multiplicity of slits, a transparent layer is arranged in the slits, and the slits exist on an outer surface of the reflective polarizer.

This application further provides a display panel, comprising:
a first substrate, comprising a reflective polarizer;
a second substrate, arranged parallel and opposite to the first substrate; and
a duty cycle circuit, arranged in the display panel, and configured to adjust a duty cycle corresponding to the reflective polarizer to block ultraviolet light.

Optionally, the first substrate comprises a first glass substrate, and the reflective polarizer is arranged on an inner side of the first glass substrate.

Optionally, there is only one reflective polarizer in the display panel.

Optionally, the first substrate further comprises a transparent layer, the transparent layer is made of a photic material, the reflective polarizer comprises metal gratings and slits, the metal gratings are arranged on an inner side of the glass substrate, the slits are formed between the metal gratings, the reflective polarizer comprises a multiplicity of slits, the transparent layer is arranged in the slits, and the slits exist on the inner side of the glass substrate.

Optionally, the first substrate comprises the reflective polarizer, a transparent layer, and a first glass substrate; the transparent layer is made of a photic material; the transparent layer is arranged on the reflective polarizer; the first substrate comprises the first glass substrate; the reflective polarizer is arranged on an inner side of the first glass substrate; there is only one reflective polarizer in the display panel; the reflective polarizer comprises metal gratings and slits; the metal gratings are arranged on the glass substrate; the slits are formed between the metal gratings; the reflective polarizer comprises a multiplicity of slits; the transparent layer is arranged in the slits; the slits exist on an outer surface of the reflective polarizer, the display panel comprises a liquid crystal cell; the first substrate further comprises a color resist layer; the color resist layer is arranged above the transparent layer; the second substrate comprises a second glass substrate and an active switch array; the liquid crystal cell is arranged between the first substrate and the second substrate; and the active switch array is arranged below the liquid crystal cell.

Optionally, the shape of the reflective polarizer of the first substrate corresponds to that of the first glass substrate, and the first substrate is in contact with the first glass substrate.

Optionally, the duty cycle circuit adjusts a duty cycle range corresponding to the reflective polarizer to 0.8-0.9.

Optionally, the duty cycle circuit is arranged on the second substrate.

This application further discloses a device.
A display device comprises the display panel mentioned.

BRIEF DESCRIPTION OF DRAWINGS

The drawings included are used for providing further understanding of embodiments of this application, constitute part of the description, and are used for illustrating implementation manners of the present application, and interpreting principles of this application together with text description. Apparently, the drawings in the following description are merely some embodiments of this application, and for those ordinary skilled in the art, other drawings can also be obtained according to the drawings without contributing creative labor. In the drawings.

DETAILED DESCRIPTION

Figure 1:
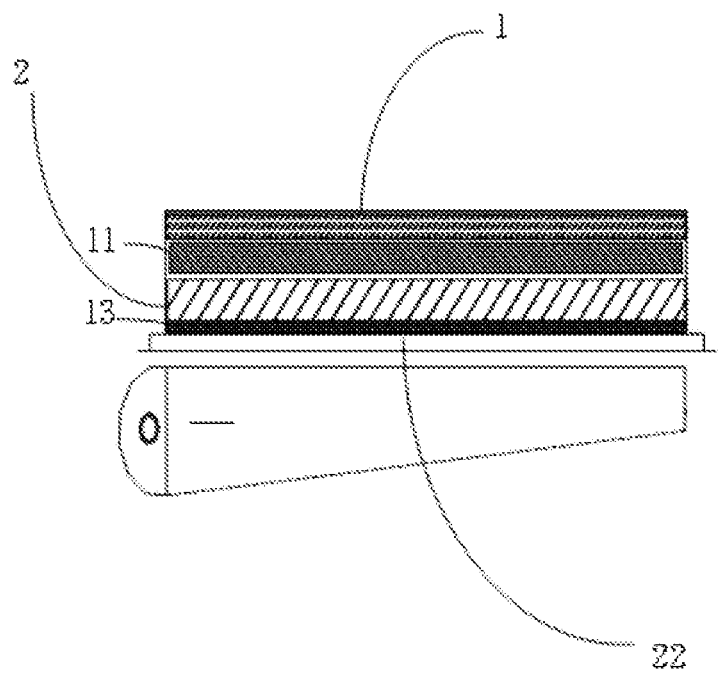
FIG. 1 is an auxiliary schematic diagram of an entire structure of a display panel according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned device or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a multiplicity of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

This application is further described below with reference to the accompanying drawings and preferred embodiments.

As shown in FIG. 1 to FIG. 4, an embodiment of this application discloses a display panel 1. The display panel 1 includes:

a first substrate 2, including a reflective polarizer 6;

a second substrate 3, arranged parallel and opposite to the first substrate 2; and a duty cycle circuit 4, arranged in the display panel 1, and configured to adjust a duty cycle corresponding to the reflective polarizer 6 to block ultraviolet light.

The first substrate 2 includes the reflective polarizer 6. A duty cycle adjusting circuit adjusts the duty cycle corresponding to the reflective polarizer 6 to block ultraviolet light. The first substrate 2 includes a first glass substrate 5. The reflective polarizer 6 is arranged on an inner side of the first glass substrate 5. There is only one reflective polarizer 6 in the display panel 1. The reflective polarizer 6 includes metal gratings 9 and slits 8. The metal gratings 9 are arranged on the reflective polarizer 6. The slits 8 are formed between the metal gratings 9. The reflective polarizer 6 includes a multiplicity of slits 8. A transparent layer 7 is arranged in the slits 8. The slits 8 exist on an outer surface of the reflective polarizer 6.

Figure 2:
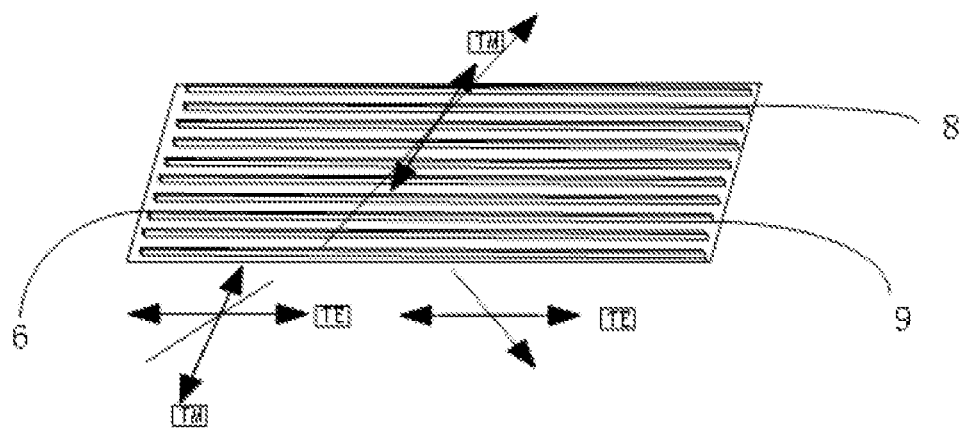
FIG. 2 is a schematic structural diagram of a reflective polarizer according to an embodiment of this application.
Figure 3:
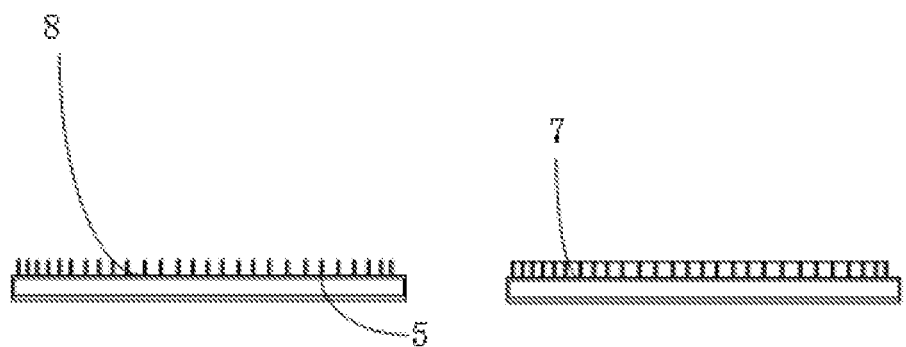
FIG. 3 is a schematic diagram of structural details according to another embodiment of this application.
Figure 4:
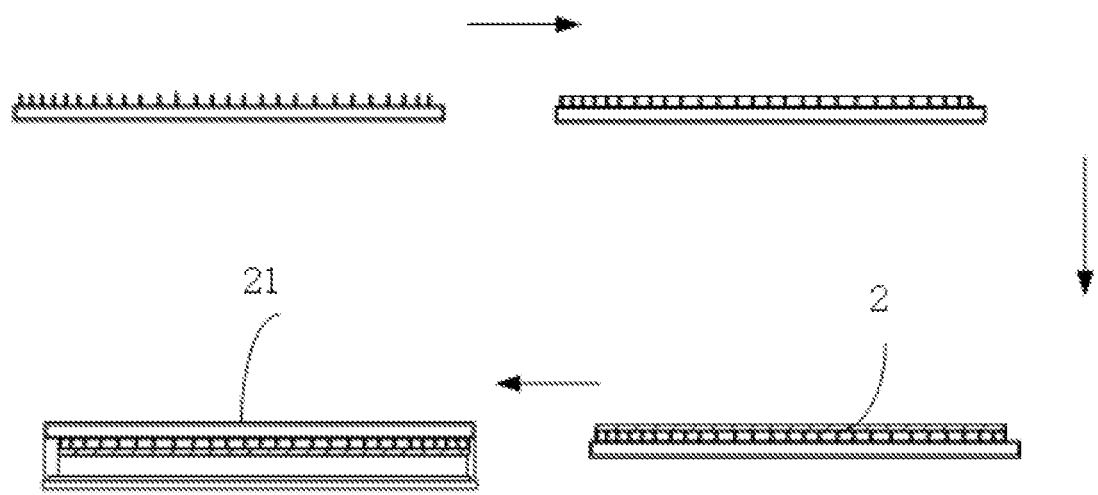
FIG. 4 is a schematic diagram of an entire panel according to another embodiment of this application.

In another embodiment of this application, referring to FIG. 2 to FIG. 4, a display panel 1 is disclosed. The display panel 1 includes:

a first substrate 2, including a reflective polarizer 6;

a second substrate 3, arranged parallel and opposite to the first substrate 2; and a duty cycle circuit 4, arranged in the display panel 1, and configured to adjust a duty cycle corresponding to the reflective polarizer 6 to block ultraviolet light.

The first substrate 2 includes the reflective polarizer 6. A duty cycle adjusting circuit adjusts the duty cycle corresponding to the reflective polarizer 6 to block ultraviolet light.

For example, an original polarizer is located at the first substrate. A lower polarizer is located at an inner side of the second substrate, and a film is adhered thereto for protection. It is complex to manufacture the lower polarizer, and the lower polarizer is easy to deteriorate. The reflective polarizer 6 in this application has a simple manufacturing process, strong weather-proof performance, and a high light transmission rate. When ultraviolet light penetrates a transparent layer 7, adjusting a duty cycle of the duty cycle circuit can greatly reduce a transmission rate of the ultraviolet light, thereby prolonging durability of an LCD.

Optionally, in this embodiment, the first substrate 2 includes:

a first glass substrate 5.

The reflective polarizer 6 is arranged on an inner side of the first glass substrate 5. Manufacturing the reflective polarizer 6 at an inner side surface of the first glass substrate 5 can prevent the reflective polarizer 6 from being scratched or scraped, and there is no need to additionally adhere a protective film at a surface of the reflective polarizer 6.

Optionally, in this embodiment, there is only one reflective polarizer 6 in the display panel 1. For example, the polarizer of the display panel 1 is arranged on inner sides of the first substrate 2 and the second substrate 3. As a result, the thickness of a display screen is increased. Because there is only one reflective polarizer 6, the thickness of an LCD is entirely reduced.

Optionally, in this embodiment, the reflective polarizer 6 includes metal gratings 9 and slits 8. The metal gratings 9 are arranged on the reflective polarizer. The slits 8 are formed between the metal gratings 9. The reflective polarizer 6 includes a multiplicity of slits 8. The transparent layer 7 is arranged in the slits 8. The slits 8 exist on an outer surface of the reflective polarizer 6.

The reflective polarizer 6 has a high light transmission rate. Excessive ultraviolet light may cause a color resistor to deteriorate, breaking other materials in a display circuit. The transparent layer 7 is equivalent to a passivation layer 21. The transmission rate of the ultraviolet light can be significantly reduced by adjusting a duty circle of the metal grating.

Optionally, in this embodiment, the display panel 1 includes that:

Metal gratings 9 are arranged on the reflective polarizer 6. Slits 8 are formed between the metal gratings 9. The reflective polarizer 6 includes a multiplicity of slits 8. A transparent layer 7 is arranged in the slits 8. The slits 8 exist on an outer surface of the reflective polarizer 6. The display panel includes a liquid crystal cell. The first substrate further includes a color resist layer 11. The color resist layer 11 is arranged above the transparent layer 7. The second substrate 2 includes a second glass substrate 23 and an active switch array 13. The liquid crystal cell is arranged between the first substrate 2 and the second substrate 3. The active switch array 13 is arranged below the liquid crystal cell 12.

A compact panel structure reduces the thickness of the LCD. The transparent layer 7 is filled in the slits 8 of the first glass substrate 5 and the first substrate 2 to be passivated. Because of being made of a transparent material, the transparent layer 7 significantly reduces a light transmission rate of ultraviolet light by adjusting a duty circle. As a result, a transmission rate of the ultraviolet light of the entire panel structure is significantly reduced.

Optionally, the shape of the polarizer of the first substrate 2 corresponds to that of the first glass substrate 5, and the first substrate 2 is in contact with the first glass substrate 5.

Correspondence between the shapes of the polarizer and the first glass substrate 5 ensures integrity of display, and achieves best effect of polarized light and a maximum protective area of ultraviolet light, thereby ensuring durability of the LCD.

Optionally, a range of the duty cycle is 0.8-0.9.

Light at TE and TM polarization directions has different refractive indexes. According to an equivalent medium theory, it may be learned that refractive indexes of a wire grating polarizer (WGP) for TE and TM polarized light are as follows:

$$n_2^{TE} = [\varepsilon_2^{TE}]^{\frac{1}{2}} = [n_1^2(1-f) + n_3^2 f]^{\frac{1}{2}}; \text{ and} \quad (1)$$

$$n_2^{TM} = [\varepsilon_2^{TM}]^{-\frac{1}{2}} = \left[\frac{1-f}{n_1^2} + \frac{f}{n_3^2}\right]^{-\frac{1}{2}} \quad (2)$$

In the formulas: $n_1$ indicates a refractive index of a material in the slit; $n_3$ indicates a refractive index of a metal line; f=W/P indicates a duty cycle of a grating; W indicates the width of the metal line; P indicates a cycle of a stripe structure; and $n_2$ indicates an equivalent refractive index of a grating interface.

In a case of not considering absorption, a transmission rate of the WGP can be calculated through the following formula:

$$T \approx 1 - R = 1 - \frac{(n_2 - 1)^2 + \kappa_2^2}{(n_2 + 1)^2 + \kappa_2^2} \quad (3)$$

It can be known from the above that when aluminum (but not limited to aluminum) is used as a wire grating material, a cycle duty of the WGP can be changed to research transmission rates thereof for light having different wavelengths (some of the wavelengths). Results are shown below:

| | | f indicates a duty cycle $n_1$ indicates a refractive index of a material in the slit | | | | | | | |
|---|---|---|---|---|---|---|---|---|---|
| | | f = 0.5/n = 1 | | f = 0.8/n = 1 | | f = 0.9/n = 1 | | f = 0.95/n = 1 | |
| Wavelength | Refractive index | $T_{TM}$ | $T_{TE}$ | $T_{TM}$ | $T_{TE}$ | $T_{TM}$ | $T_{TE}$ | $T_{TM}$ | $T_{TE}$ |
| 280 nm | 0.232 + 3.318i | 96.23% | 10.79% | 77.70% | 8.34% | 44.18% | 7.62% | 11.46% | 7.62% |
| 350 nm | 0.366 + 4.212i | 96.57% | 10.29% | 81.19% | 8.37% | 60.02% | 7.89% | 21.17% | 7.67% |
| 380 nm | 0.437 + 4.586i | 96.65% | 10.78% | 81.96% | 8.47% | 62.77% | 7.99% | 30.48% | 7.77% |
| 400 nm | 0.487 + 4.835i | 96.69% | 10.83% | 82.36% | 8.51% | 64.11% | 8.04% | 35.48% | 7.82% |
| 500 nm | 0.812 + 6.048i | 96.83% | 11.49% | 83.39% | 9.09% | 67.96% | 8.59% | 47.70% | 8.36% |
| 600 nm | 1.262 + 7.185i | 96.91% | 12.43% | 84.20% | 9.92% | 69.73% | 9.36% | 52.30% | 9.12% |
| 700 nm | 1.921 + 8.142i | 96.95% | 14.30% | 84.53% | 11.43% | 70.70% | 10.80% | 54.65% | 10.53% |
| 780 nm | 2.654 + 8.464i | 96.97% | 17.28% | 84.71% | 13.88% | 71.16% | 13.13% | 55.72% | 12.80% |

In view of the foregoing table, when air exists in the slit ($n_1=1$), transmission rates of TE and TM light are reduced as the duty cycle f is increased. Considering problems in process, it can be known by selecting f=0.8 and 0.9 calculate that a higher refractive index of a material filled in the slit indicates a lower transmission rate of ultraviolet light (UVA: 280-380 nm) (when a transmission rate of visible light is sacrificed), as shown in the following table:

| | | f indicates a duty cycle $n_1$ indicates a refractive index of a material in the slit | | | | | | | |
|---|---|---|---|---|---|---|---|---|---|
| | | f = 0.8/n = 1.5 | | f = 0.8/n = 2 | | f = 0.9/n = 1.5 | | f = 0.9/n = 2 | |
| Wavelength | Refractive index | $T_{TM}$ | $T_{TE}$ | $T_{TM}$ | $T_{TE}$ | $T_{TM}$ | $T_{TE}$ | $T_{TM}$ | $T_{TE}$ |
| 280 nm | 0.232 + 3.318i | 42.23% | 8.67% | 12.23% | 9.17% | 10.75% | 7.97% | 8.65% | 8.16% |
| 350 nm | 0.366 + 4.212i | 57.79% | 8.57% | 29.84% | 8.89% | 17.96% | 7.97% | 10.10% | 8.08% |
| 380 nm | 0.437 + 4.586i | 60.52% | 8.65% | 37.72% | 8.91% | 25.95% | 8.06% | 11.20% | 8.16% |
| 400 nm | 0.487 + 4.835i | 61.85% | 8.67% | 41.22% | 8.92% | 31.26% | 8.10% | 12.15% | 8.18% |
| 500 nm | 0.812 + 6.048i | 65.70% | 9.20% | 50.06% | 9.36% | 44.67% | 8.63% | 22.67% | 8.69% |
| 600 nm | 1.262 + 7.185i | 67.46% | 9.99% | 53.64% | 10.11% | 49.63% | 9.40% | 32.95% | 9.44% |
| 700 nm | 1.921 + 8.142i | 68.44% | 11.49% | 55.52% | 11.59% | 52.13% | 10.83% | 37.91% | 10.87% |
| 780 nm | 2.654 + 8.464i | 68.90% | 13.94% | 56.39% | 14.04% | 53.28% | 13.16% | 40.11% | 13.20% |

Therefore, a higher refractive index of the material filled in the slit 8 indicates a lower transmission rate of ultraviolet light. Transmission rates of light having different wavelengths (ultraviolet light and visible light) can be controlled by adjusting the duty cycle of the reflective polarizer 6 and the refractive index of the material of the slit 8, to meet use of a liquid crystal panel at different conditions.

Optionally, in this embodiment, the duty cycle circuit 4 is arranged on the second substrate 3.

Disposing on the second substrate 3 provides enough space to adjust a wavelength of transmitted light through the reflective polarizer 6, and there may be space for buffering, being easy to better adjust the transmission rates of light (ultraviolet light and visible light).

Figure 5:
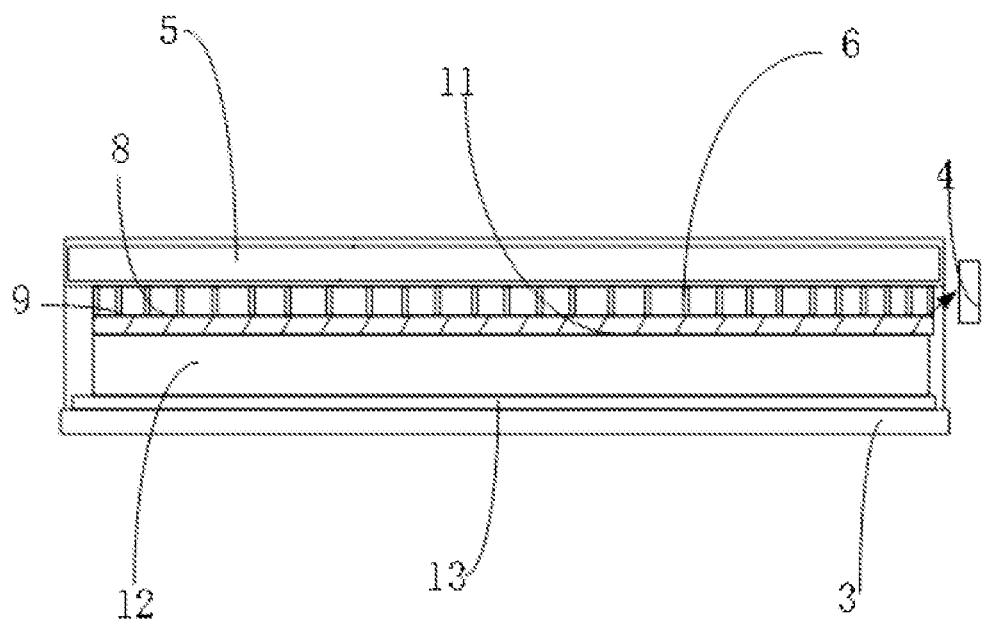
FIG. 5 is a schematic diagram of an entire device according to another embodiment of this application.

In another embodiment of this application, referring to FIG. 5, a display device 22 is disclosed.

The display device 22 includes the display panel 1 according to any one of the foregoing embodiments.

Transmission rates of light having different wavelengths (ultraviolet light and visible light) can be controlled by adjusting the duty cycle of the reflective polarizer 6 and the refractive index of the material of the slit 8, to meet use of a liquid crystal panel at different conditions.

The display panel of this application may be a twisted nematic (TN) panel, an in-plane switching (IPS) panel, or a multi-domain vertical alignment (VA) panel, and may certainly be any other suitable type of panel.

The foregoing contents are detailed descriptions of this application in conjunction with specific preferred embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising:
   a first substrate, comprising a reflective polarizer;
   a second substrate, arranged parallel and opposite to the first substrate; and
   a duty cycle circuit, arranged in the display panel, and configured to adjust a duty cycle corresponding to the reflective polarizer to block ultraviolet light,
   wherein the first substrate comprises a first glass substrate, the reflective polarizer is arranged on an inner side of the first glass substrate, the reflective polarizer comprises metal gratings and slits, the slits are formed between the metal gratings, the reflective polarizer comprises a multiplicity of slits, the first substrate comprises a transparent layer, the transparent layer is arranged in the slits, and the slits exist on an outer surface of the reflective polarizer.

2. A display panel, comprising:
   a first substrate, comprising a reflective polarizer;
   a second substrate, arranged parallel and opposite to the first substrate; and
   a duty cycle circuit, arranged in the display panel, and configured to adjust a duty cycle corresponding to the reflective polarizer to block ultraviolet light.

3. The display panel according to claim 2, Wherein the first substrate comprises a first glass substrate, and the reflective polarizer is arranged on an inner side of the first glass substrate.

4. The display panel according to claim 2, wherein there is only one reflective polarizer in the display panel.

5. The display panel according to claim 2, wherein the first substrate further comprises a transparent layer, the transparent layer is made of a photic material, the reflective polarizer comprises metal gratings and slits, the metal gratings are arranged on an inner side of the glass substrate, the slits are formed between the metal gratings, the reflective polarizer comprises a multiplicity of slits, the transparent layer is arranged in the slits, and the slits exist on the inner side of the glass substrate.

6. The display panel according to claim 2, wherein the first substrate comprises the reflective polarizer, a transparent layer, and a first glass substrate; the transparent layer is made of a photic material; the transparent layer is arranged on the reflective polarizer; the reflective polarizer is arranged on an inner side of the first glass substrate; there is only one reflective polarizer in the display panel; the reflective polarizer comprises metal gratings and slits; the metal gratings are arranged on the glass substrate; the slits are formed between the metal gratings; the reflective polarizer comprises a multiplicity of slits; the transparent layer is arranged in the slits; the slits exist on an outer surface of the reflective polarizer; the display panel comprises a liquid crystal cell; the first substrate further comprises a color resist layer; the color resist layer is arranged above the transparent layer; the second substrate comprises a second glass substrate and an active switch array; the liquid crystal cell is arranged between the first substrate and the second substrate; and the active switch array is arranged below the liquid crystal cell.

7. The display panel according to claim 6, wherein the shape of the reflective polarizer of the first substrate corresponds to that of the first glass substrate, and the first substrate is in contact with the first glass substrate.

8. The display panel according to claim 2, wherein the duty cycle circuit adjusts a duty cycle range corresponding to the reflective polarizer to 0.8-0.9.

9. The display panel according to claim 8, wherein the duty cycle circuit is arranged on the second substrate.

10. A display device, comprising a display panel, the display panel comprising:

a first substrate, comprising a reflective polarizer;

a second substrate, arranged parallel and opposite to the first substrate; and a duty cycle circuit, arranged in the display panel, and configured to adjust a duty cycle corresponding to the reflective polarizer to block ultraviolet light.

11. The display device according to claim 10, wherein the first substrate comprises a first glass substrate, and the reflective polarizer is arranged on an inner side of the first glass substrate.

12. The display device according to claim 10, wherein there is only one reflective polarizer in the display panel.

13. The display device according to claim 10, wherein the first substrate further comprises a transparent layer, the transparent layer is made of a transparent material, the reflective polarizer comprises metal gratings and slits, the metal gratings are arranged on an inner side of the glass substrate, the slits are formed between the metal gratings, the reflective polarizer comprises a multiplicity of slits, the transparent layer is arranged in the slits, and the slits exist on the inner side of the glass substrate.

14. The display device according to claim 10, wherein the first substrate comprises the reflective polarizer, a transparent layer, and a first glass substrate; the transparent layer is made of a photic material; the transparent layer is arranged on the reflective polarizer; the first substrate comprises the first glass substrate; the reflective polarizer is arranged on an inner side of the first glass substrate; there is only one reflective polarizer in the display panel; the reflective polarizer comprises metal gratings and slits; the metal gratings are arranged on the glass substrate; the slits are formed between the metal gratings; the reflective polarizer comprises a multiplicity of slits; the transparent layer is arranged in the slits; the slits exist on an outer surface of the reflective polarizer; the display panel comprises a liquid crystal cell; the first substrate further comprises a color resist layer; the color resist layer is arranged above the transparent layer; the second substrate comprises a second glass substrate and an active switch array; the liquid crystal cell is arranged between the first substrate and the second substrate; and the active switch array is arranged below the liquid crystal cell.

15. The display device according to claim 14, wherein the shape of the reflective polarizer of the first substrate corresponds to that of the first glass substrate, and the first substrate is in contact with the first glass substrate.

16. The display device according to claim 10, wherein the duty cycle circuit adjusts the duty cycle range corresponding to the reflective polarizer to 0.8-0.9.

17. The display device according to claim 16, wherein the duty cycle circuit is arranged on the second substrate.

* * * * *